United States Patent
Kang et al.

(10) Patent No.: US 10,302,997 B2
(45) Date of Patent: May 28, 2019

(54) BACKLIGHT UNIT AND DISPLAY DEVICE HAVING THE SAME

(71) Applicant: SAMSUNG ELECTRONICS CO., LTD., Suwon-si (KR)

(72) Inventors: Min Woo Kang, Suwon-si (KR); Seung Jun Jeong, Hwaseong-si (KR); Ki Hyung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/699,118

(22) Filed: Sep. 8, 2017

(65) Prior Publication Data

US 2018/0136517 A1  May 17, 2018

(30) Foreign Application Priority Data

Nov. 14, 2016  (KR) .......................... 10-2016-0151238

(51) Int. Cl.
| | |
|---|---|
| *G02F 1/133* | (2006.01) |
| *G02F 1/1335* | (2006.01) |
| *F21V 8/00* | (2006.01) |
| *G02F 1/1343* | (2006.01) |

(52) U.S. Cl.
CPC ....... *G02F 1/133602* (2013.01); *G02B 6/005* (2013.01); *G02B 6/0016* (2013.01); *G02B 6/0025* (2013.01); *G02B 6/0031* (2013.01); *G02B 6/0061* (2013.01); *G02F 1/1343* (2013.01); *G02B 6/0036* (2013.01)

(58) Field of Classification Search
None
See application file for complete search history.

(56) References Cited

U.S. PATENT DOCUMENTS

| | | | |
|---|---|---|---|
| 5,550,676 A * | 8/1996 | Ohe ..................... | G02B 6/0001 359/599 |
| 6,612,710 B2 | 9/2003 | Suzuki et al. | |
| 7,339,635 B2 | 3/2008 | Freking et al. | |
| 2003/0156233 A1* | 8/2003 | Ohsumi .............. | G02B 6/0038 349/65 |
| 2006/0227569 A1* | 10/2006 | Uehara ................. | G02F 1/1323 362/561 |
| 2008/0101088 A1 | 5/2008 | Kim et al. | |
| 2008/0285304 A1 | 11/2008 | Rankin, Jr. et al. | |
| 2010/0067257 A1* | 3/2010 | Meis .................... | G02B 5/0841 362/624 |
| 2011/0025950 A1 | 2/2011 | Lee et al. | |

(Continued)

OTHER PUBLICATIONS

International Search Report dated Jan. 24, 2018, issued by the International Searching Authority in counterpart International Patent Application No. PCT/KR2017/010541 (PCT/ISA/210).

*Primary Examiner* — James A Dudek
(74) *Attorney, Agent, or Firm* — Sughrue Mion, PLLC

(57) ABSTRACT

A display device is provided. The display device includes: a backlight; and a display panel configured to create an image by selectively blocking light emitted from the backlight, the backlight including a light regulator configured to regulate emission of incident light; a light guide plate arranged behind the light regulator; and a plurality of adhesives arranged to bond the light regulator and the light guide plate, respective cross-section areas of the plurality of adhesives increasing as distance from a light source increases.

14 Claims, 10 Drawing Sheets

(56) References Cited

U.S. PATENT DOCUMENTS

2012/0249886 A1* 10/2012 Kuromizu ............ G02B 6/0088
348/725
2012/0281273 A1    11/2012 Shinkai et al.

* cited by examiner

BACKLIGHT UNIT AND DISPLAY DEVICE HAVING THE SAME

CROSS-REFERENCE TO RELATED APPLICATION

This application claims priority from Korean Patent Application No. 10-2016-0151238, filed on Nov. 14, 2016 in the Korean Intellectual Property Office, the disclosure of which is incorporated herein by reference in its entirety.

BACKGROUND

1. Field

Methods and apparatuses consistent with exemplary embodiments relate to a display device.

2. Related Art

Display devices display obtained or stored electrical information by converting the electrical information to visual information, and are widely used in various fields such as homes or work places.

There are many different display devices such as monitor devices connected to personal computers (PCs) or server computers, portable computer systems, Global Positioning System (GPS) terminals, general television sets, Internet protocol televisions (IPTVs), portable terminals, e.g., smart phones, tablet PCs, personal digital assistants (PDAs), and cellular phones, any other display device for reproducing images like advertisements or films, or other various kinds of audio/video system.

The display device may use many different display types to display still images or moving images for the user. The display types may include cathode-ray tubes (CRTs), Light Emitting Diodes (LEDs), Organic LEDs (OLEDs), Active-Matrix OLEDs, liquid crystals or electronic paper.

SUMMARY

One or more exemplary embodiments may provide a display device able to uniformly emit light to a light regulator that regulates light scattering in a backlight unit regardless of the distance to a light source.

According to an aspect of an exemplary embodiment, there is provided a display device including: a backlight; and a display panel configured to create an image by selectively blocking light emitted from the backlight, the backlight including: a light regulator configured to regulate emission of incident light; a light guide plate arranged behind the light regulator; and a plurality of adhesives arranged to bond the light regulator and the light guide plate, and respective cross-section areas of the plurality of adhesives increasing as distance from a light source increases.

A first number of the plurality of adhesives located a first distance from the light source may be less than a second number of the plurality of adhesives located a second distance greater than the first distance from the light source.

A first gap between a first adhesive and a second adhesive of the plurality of adhesives located a first distance from the light source may be greater than a second gap between a third adhesive and a fourth adhesive of the plurality of adhesives located a second distance greater than the first distance from the light source.

The plurality of adhesives may have a refraction index corresponding to a refraction index of the light guide plate.

The plurality of adhesives may have a refraction index corresponding to a refraction index of the light regulator.

Each of the plurality of adhesives may be thinner than a predetermined thickness.

The light guide plate may define a plurality of grooves in which the plurality of adhesives are located, and each of the plurality of adhesives may be thinner than a predetermined thickness.

The light regulator may include: a light regulating layer including a material to regulate emission of incident light; and a plurality of electrodes respectively arranged on front and back sides of the light regulating layer, and each of the plurality of electrodes may be configured to apply voltage to the light regulating layer.

According to an aspect of another exemplary embodiment, there is provided a backlight including: a light source; a light guide plate configured to scatter light emitted from the light source; a light regulator disposed on the light guide plate and configured to regulate emission of incident light; and a plurality of adhesives arranged to bond the light regulator and the light guide plate, a first number of the plurality of adhesives located a first distance from the light source being less than a second number of the plurality of adhesives located a second distance greater than the first distance from the light source.

Respective cross-section areas of the plurality of adhesives may increase as distance from the light source increases.

A first gap between a first adhesive and a second adhesive of the plurality of adhesives located the first distance from the light source may be greater than a second gap between a third adhesive and a fourth adhesive of the plurality of adhesives located the second distance from the light source.

The plurality of adhesives may have a refraction index corresponding to a refraction index of the light guide plate.

The plurality of adhesives may have a refraction index corresponding to a refraction index of the light regulator.

Each of the plurality of adhesives may be thinner than a predetermined thickness.

The light guide plate may define a plurality of grooves in which the plurality of adhesives are located on the top, and each of the plurality of adhesives may be thinner than a predetermined thickness.

According to an aspect of yet another exemplary embodiment, there is provided a display device including: a backlight; and a display panel configured to create an image by selectively blocking light emitted from the backlight, the backlight including: a light regulator configured to regulate emission of incident light; a light guide plate disposed on a first side of the light regulator; and a plurality of adhesives arranged to bond the light regulator and the light guide plate, and at least one among respective of cross-section areas and quantity of the plurality of adhesives increasing as distance from a light source increases.

A first gap between a first adhesive and a second adhesive of the plurality of adhesives located a first distance from the light source may be greater than a second gap between a third adhesive and a fourth adhesive of the plurality of adhesives located a second distance from the light source.

The plurality of adhesives may have a refraction index corresponding to at least one among a refraction index of the light guide plate and a refraction index of the light regulator.

BRIEF DESCRIPTION OF THE DRAWINGS

The above and other objects, features and advantages will become more apparent to those of ordinary skill in the art from the following description of exemplary embodiments, taken in conjunction with reference to the accompanying drawings, in which.

DETAILED DESCRIPTION

Figure 1:
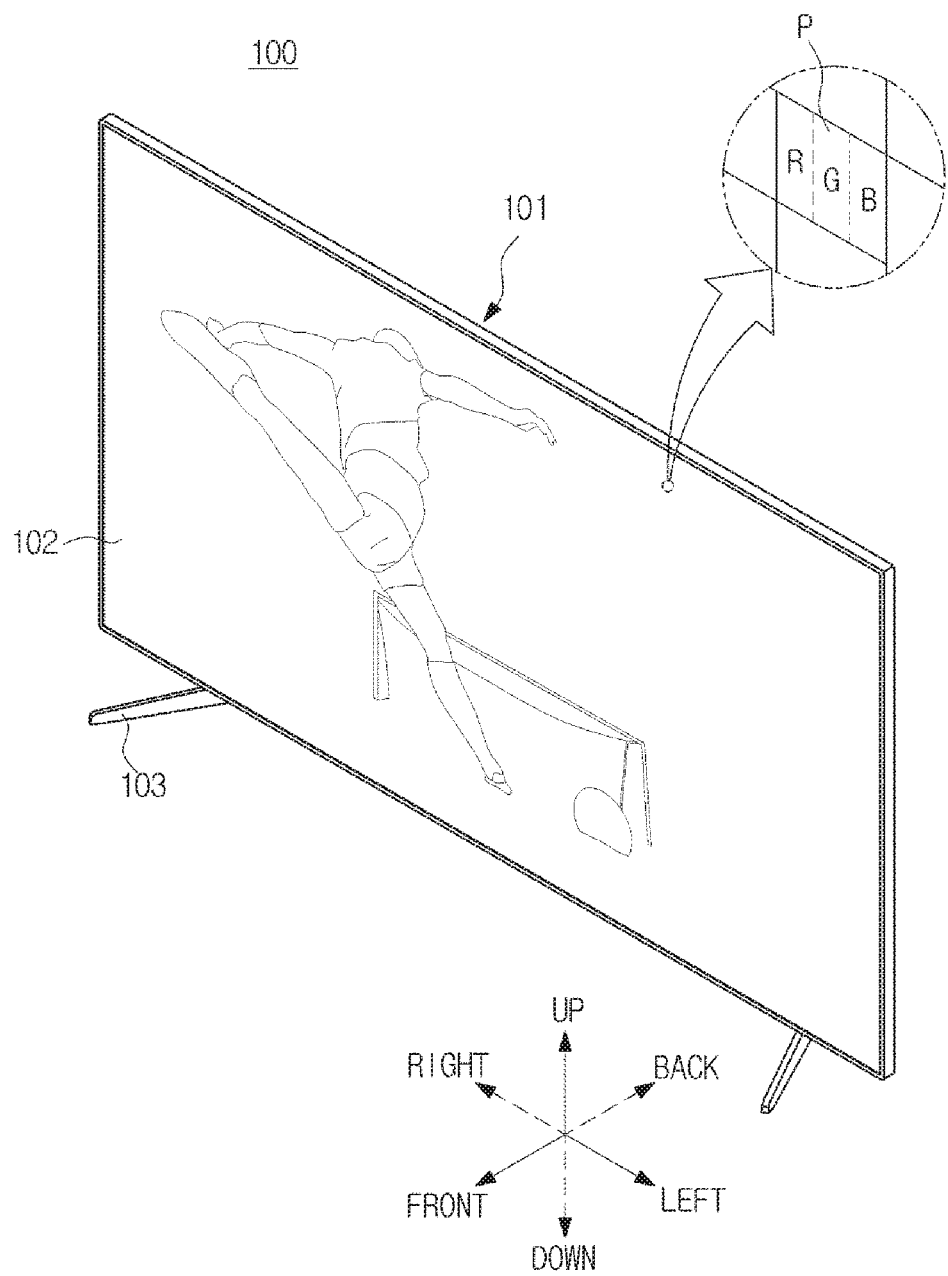
FIG. 1 is an exterior view of a display device, according to an exemplary embodiment.

Reference will now be made to exemplary embodiments, aspects of which are illustrated in the accompanying drawings, wherein like reference numerals refer to like elements throughout.

The terminology used herein is for the purpose of describing particular exemplary embodiments only.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like 'first', 'second', etc., are used to tell one element from another, without limiting the elements.

Furthermore, the terms, such as "~ part", "~ block", "~ member", "~ module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

Expressions such as "at least one of" when preceding a list of elements, modify the entire list of elements and do not modify the individual elements of the list.

The term 'white light' herein used refers to a mixture of red light, green light, and blue light, or a mixture of blue light and yellow light. The term 'natural light' refers to light with all wavelengths combined in a region of visible rays.

FIG. 1 is an exterior view of a display device, according to an exemplary embodiment.

A display device 100 is a device for processing image signals received from the outside and visually presenting the processed image. In the following description, it is assumed that the display device 100 is a television (TV), but exemplary embodiments are not limited thereto. For example, the display device 100 may be implemented in various forms, such as a monitor, a portable multimedia device, a portable communication device, and any device that may visually present images.

As shown in FIG. 1, the display device 100 may include a main body 101, a screen 102 for displaying an image, and a supporter 103 arranged under the main body 101 for supporting the main body 101.

The main body 101 forms the exterior of the display device 100, and may include parts for the display device 100 to display an image or perform various functions. Although the main body 101 of FIG. 1 is shaped like a flat plate, it is not limited thereto. For example, the main body 101 may have a curved form with left and right ends relatively coming forward and the other parts curved backward.

The screen 102 may be formed on the front of the main body 101 for displaying visual information, i.e., an image. For example, the screen may display still or moving images as two dimensional (2D) plane images or three dimensional (3D) stereographic images using binocular parallax.

A plurality of pixels P are formed on the screen 102, and an image to be displayed on the screen 102 may be formed by a combination of light emitted by the pixels P. Like a mosaic, a still image may be formed on the screen 102 by a combination of light emitted by the pixels P.

Each of the pixels P may emit light in various colors and brightness. For example, the plurality of pixels P may each have a red sub-pixel R, a green sub-pixel G, and a blue sub-pixel B to form an image in many different colors. The red sub-pixel R may emit red light of various levels of brightness; the green sub-pixel G may emit green light of various levels of brightness; the blue sub-pixel B may emit blue light of various levels of brightness. The red light has a wavelength in a range of about 620 nanometer (nm) to about 750 nm; the green light has a wavelength in a range of about 495 nm to about 495 nm; the blue light has a wavelength in a range of about 450 nm to about 495 nm.

By combinations of the red light of the red sub-pixel R, the green light of the green sub-pixel G, and the blue light of the blue sub-pixel B, each pixel P may produce various brightness and colors of light.

The supporter 103 may be installed under the main body 101 for supporting the main body 101 to stay in a stable position. Alternatively, the supporter 103 may be installed on the back of the main body 101 to fix the main body 101 onto the wall.

While the supporter 103 is shown to have a bar shape that protrudes forward from under the main body 101 in FIG. 1, it is not limited thereto, but may have any shape that may stably support the main body 101.

Figure 2:
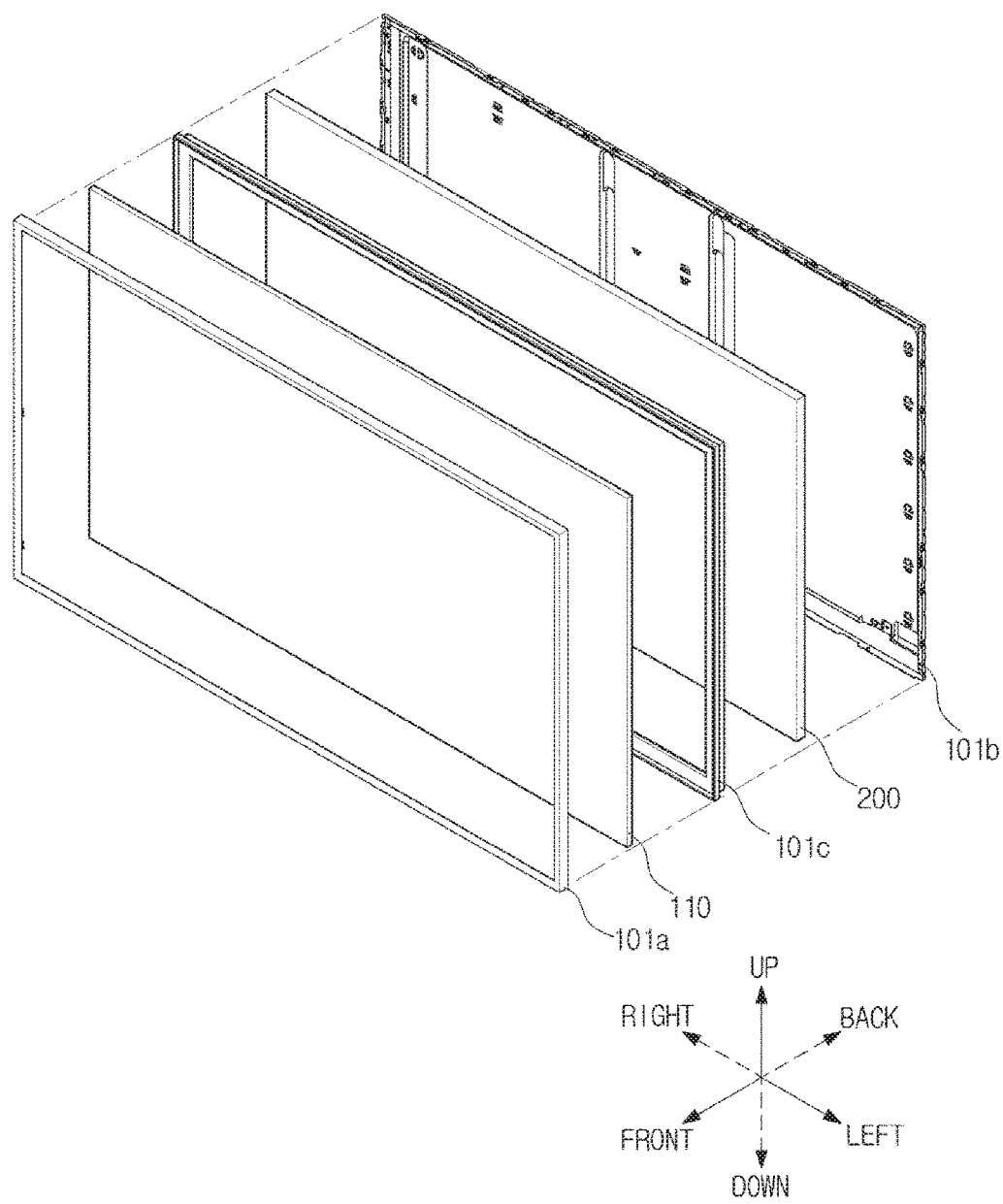
FIG. 2 is an exploded view of a display device, according to an exemplary embodiment.

FIG. 2 is an exploded view of a display device, according to an exemplary embodiment.

Referring to FIG. 2, the main body 101 may include many different kinds of components to create an image on the screen 102. Specifically, the main body 101 may include a backlight unit 200 for emitting planar light, and an image forming unit 110 for creating an image by transmitting or blocking the light emitted from the backlight unit 200.

The main body 101 may also include a front chassis 101a, a back chassis 101b, and a mold frame 101c to fix the image forming unit 110 and the backlight unit 200.

The front chassis 101a may have the form of a plate with an opening formed on the front. The user may see the image created by the image forming unit 110 through the front opening of the front chassis 101a.

The back chassis 101b has the form of a box with an open front for receiving the image forming unit 110 and the backlight unit 200 of the display device 100.

The mold frame 101c may be arranged between the front chassis 101a and the back chassis 101b. Especially, the mold frame 101c arranged between the front chassis 101a and the backlight unit 200 may fix the image forming unit 110 and the backlight unit 200.

The backlight unit 200 may include a point light source for emitting monochromatic light or white light, and refract, reflect, and scatter light to convert the light emitted from the point light source to planar light. By the refraction, reflection, and scattering of light, the backlight unit 200 may emit uniform planar light forward.

Configuration and operation of the backlight unit 200 will be described in more detail below.

The image forming unit 110 is arranged in front of the backlight unit 200 for blocking or transmitting the light emitted from the backlight unit 200 to create an image.

The front face of the image forming unit 110 constitutes the aforementioned screen 102 of the display device 100, and is comprised of the plurality of pixels P.

Each of the plurality of pixels P included in the image forming unit 110 may independently block or transmit light from the backlight unit 200. The light transmitted by the plurality of pixels P may form an image displayed by the display device 100.

The image forming unit 110 may employ a liquid crystal panel whose optical characteristics change by electric field.

As an example of the image forming unit 110, the liquid crystal panel will now be described.

Figure 3:
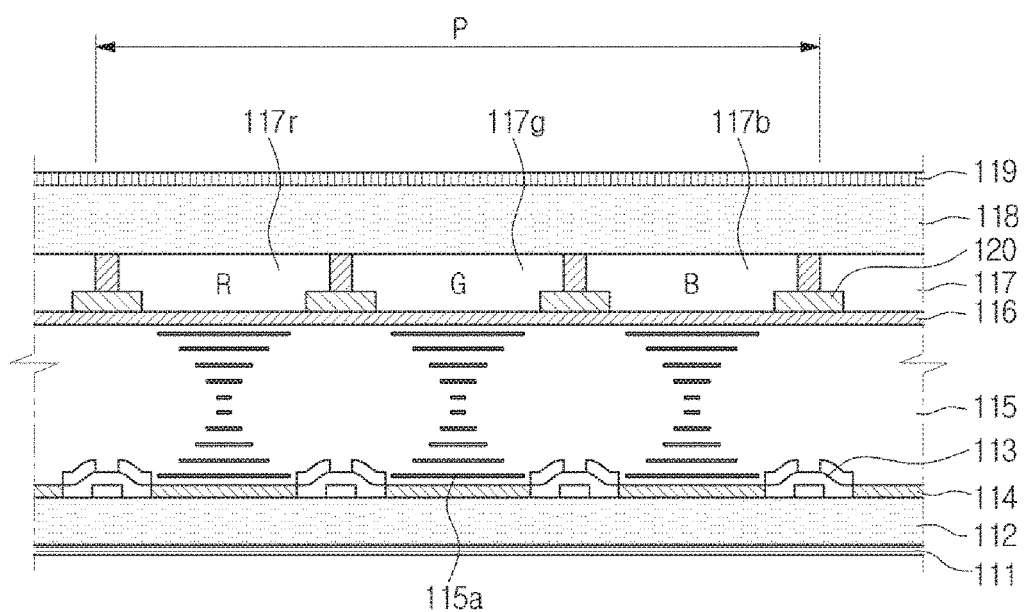
FIG. 3 is a side cross-sectional view of a pixel included in an image forming unit of a display device, according to an exemplary embodiment.

FIG. 3 is a side cross-sectional view of a pixel included in an image forming unit of a display device, according to an exemplary embodiment.

Referring to FIG. 3, the image forming unit 110 may include a first polarizer film 111, a first transparent substrate 112, a thin film transistor (TFT) 113, a pixel electrode 114, a liquid crystal layer 115, a common electrode 116, a color filter 117, a second transparent substrate 118, and a second polarizer film 119. In an exemplary embodiment, the liquid crystal panel may be defined as including the first transparent substrate 112, the TFT 113, the pixel electrode 114, the liquid crystal layer 115, the common electrode 116, the color filter 117, and the second transparent substrate 118.

The first and second transparent substrates 112 and 118 form the exterior of the image forming unit 110, and protect the liquid crystal layer 115 and the color filter 117 arranged between the first and second transparent substrates 112 and 118. The first and second transparent substrates 112 and 118 may be formed of tempered glass or transparent resin.

On the outer surfaces of the first and second transparent substrates 112 and 118, the first and second polarizer films 111 and 119 are applied, respectively.

Light has a pair of electric field and magnetic field oscillating in different directions perpendicular to a traveling direction of light. The directions of oscillation of the electric and magnetic fields may be any different directions perpendicular to the traveling direction of light. The phenomenon that an electric field or a magnetic field oscillates in only a particular direction is called polarization, and a film that transmits light having an electric or magnetic field oscillating in a predetermined direction while blocking light having an electric or magnetic field oscillating in a direction other than the predetermined direction is called a polarizer film. In other words, the polarizer film transmits light oscillating in a predetermined direction but blocks light oscillating in other directions.

The first polarizer film 111 transmits light having an electric or magnetic field oscillating in a first direction while blocking other light. The second polarizer film 119 transmits light having an electric or magnetic field oscillating in a second direction while blocking other light. The first and second directions are perpendicular to each other. In other words, a polarization direction of light transmitted by the first polarizer film 111 and an oscillation direction of light transmitted by the second polarizer film 119 are perpendicular to each other. As a result, the light in general may not penetrate both the first and second polarizer films 111 and 119 at the same time.

The color filter 117 may be arranged on the inner side of the second transparent substrate 118.

The color filter 117 may include a red color filter 117r for transmitting red light, a green color filter 117g for transmitting green light, and a blue color filter 117b for transmitting blue light, and the red, green, blue color filters 117r, 117g, and 117b may be arranged parallel to each other. The color filter 117 may also include a black matrix for preventing interference of colors between the red, green, and blue color filters 117r, 117g, and 117b, and blocking the light from the backlight unit 200 from leaking out to the other parts than the red, green, and blue color filters 117r, 117g, and 117b. The black matrix 120 is located between the red, green, and blue color filters 117r, 117g, and 117b.

The area, in which the color filter 117 is formed, corresponds to the pixel P as described above. Furthermore, the area where the red color filter 117r is formed corresponds to the red sub-pixel R; the area where the green color filter 117g is formed corresponds to the green sub-pixel G; the area where the blue color filter 117b is formed corresponds to the blue sub-pixel B. In other words, the red, green, and blue color filters 117r, 117g, and 117b form the red, green, and blue sub-pixels R, G, and B, respectively, and the combination of the red, green, and blue color filters 117r, 117g, and 117b form the pixel P.

On the inner side of the first transparent substrate 112, the TFTs 113 are formed.

Specifically, the TFTs 113 may be formed at corresponding locations between the red, green, and blue color filters 117r, 117g, and 117b. In other words, the TFTs 113 may be located between the red, green, and blue sub-pixels R, G, and B.

The TFT 113 may pass or block current flowing in the pixel electrode 114, which will be described below. Specifically, depending on whether to turn on (closing) or turn off (opening) the TFT 113, an electric field may be formed or removed from between the pixel electrode 114 and the common electrode 116. The TFT 113 may be formed of poly-silicon, and manufactured using a semiconductor process, such as lithography, deposition, or ion implantation process.

The pixel electrode 114 may be formed on the inner side of the TFT 113 of the first transparent substrate 112, and the common electrode 116 may be formed on the inner side of the color filter 117 of the second transparent substrate 118.

The pixel electrode 114 and the common electrode 116 are formed of a conductive metal material, and may produce an electric field to change arrangement of molecules of the liquid crystal layer 115, which will be described below.

In this regard, the pixel electrode 114 may be formed in the regions corresponding to the red, green, and blue color filters 117r, 117g, and 117b. As a result, electric fields may be selectively produced in the regions corresponding to the red, green, and blue color filters 117r, 117g, and 117b on the liquid crystal layer 115, which will be described later.

The pixel electrode 114 and the common electrode 116 may include a transparent material to transmit light incident from outside. The pixel electrode 114 and the common electrode 116 may also be formed of indium tin oxide (ITO), indium zinc oxide (IZO), silver (Ag) nano wire, carbon nano tube (CNT), graphene, or 3,4-ethylenedioxythiophene (PEDOT).

The liquid crystal layer 115 is formed between the pixel electrode 114 and the common electrode 116, and includes liquid crystal molecules 115a.

The liquid crystal is in an intermediate state between solid (crystal) and fluid. When heat is applied, ordinary materials are changed from a solid state to a transparent liquid state at a temperature above their melting points. By contrast, when heat is applied to a liquid crystal substance in a solid state, the liquid crystal substance changes to an opaque and muddy liquid and then into a transparent liquid state. The term liquid crystal refers to a liquid crystal state, which is an intermediate state between solid and fluid, or to a material itself in the liquid crystal state.

Most liquid crystal materials are organic compounds, the molecules of which are shaped like thin and long rods, and the arrangement of the molecules are irregular in a direction and regular in another direction. As a result, the liquid crystal has both fluidity of a liquid and optical anisotropy of a crystal (solid).

Furthermore, the liquid crystal reveals an optical property according to a change in electric field. For example, the liquid crystal may have different arrangement of molecules that form the liquid crystal, according to a change in electric field. If an electric field is produced in the liquid crystal layer 115, the liquid crystal molecules 115a of the liquid crystal layer 115 are arranged along the direction of the electric field, and otherwise if no electric field is produced in the liquid crystal layer 115, the liquid crystal molecules 115a may be arranged irregularly or arranged along the alignment layer (not shown).

As a result, the optical property of the image forming unit 110 may be changed according to the presence of an electric field in the liquid crystal layer 115.

For example, if no electric field is produced in the liquid crystal layer 115, the light polarized by the first polarizer film 111 may penetrate the second polarizer film 119 due to the arrangement of the liquid crystal molecules 115a of the liquid crystal layer 115. In other words, the light from the pixel P on which no electric field is produced in the liquid crystal layer 115 may penetrate the image forming unit 110.

On the contrary, if an electric field is produced in the liquid crystal layer 115, the light polarized by the first polarizer film 111 may not penetrate the second polarizer film 119 due to the arrangement of the liquid crystal molecules 115a of the liquid crystal layer 115. In other words, the light from the pixel P on which an electric field is produced in the liquid crystal layer 115 may be blocked by the image forming unit 110.

As described above, the image forming unit 110 may independently control light penetration of each pixel P (more specifically, red, green, and blue sub-pixels included in the pixel P). As a result, by combinations of rays from the plurality of pixels P, an image may be displayed on the screen 102 of the display device 100.

The backlight unit 200 will now be described.

The backlight unit 200 may be classified into a direct-type backlight unit and an edge-type backlight unit depending on the location of the light source. As an example, the edge-type backlight unit will now be described.

Figure 4:
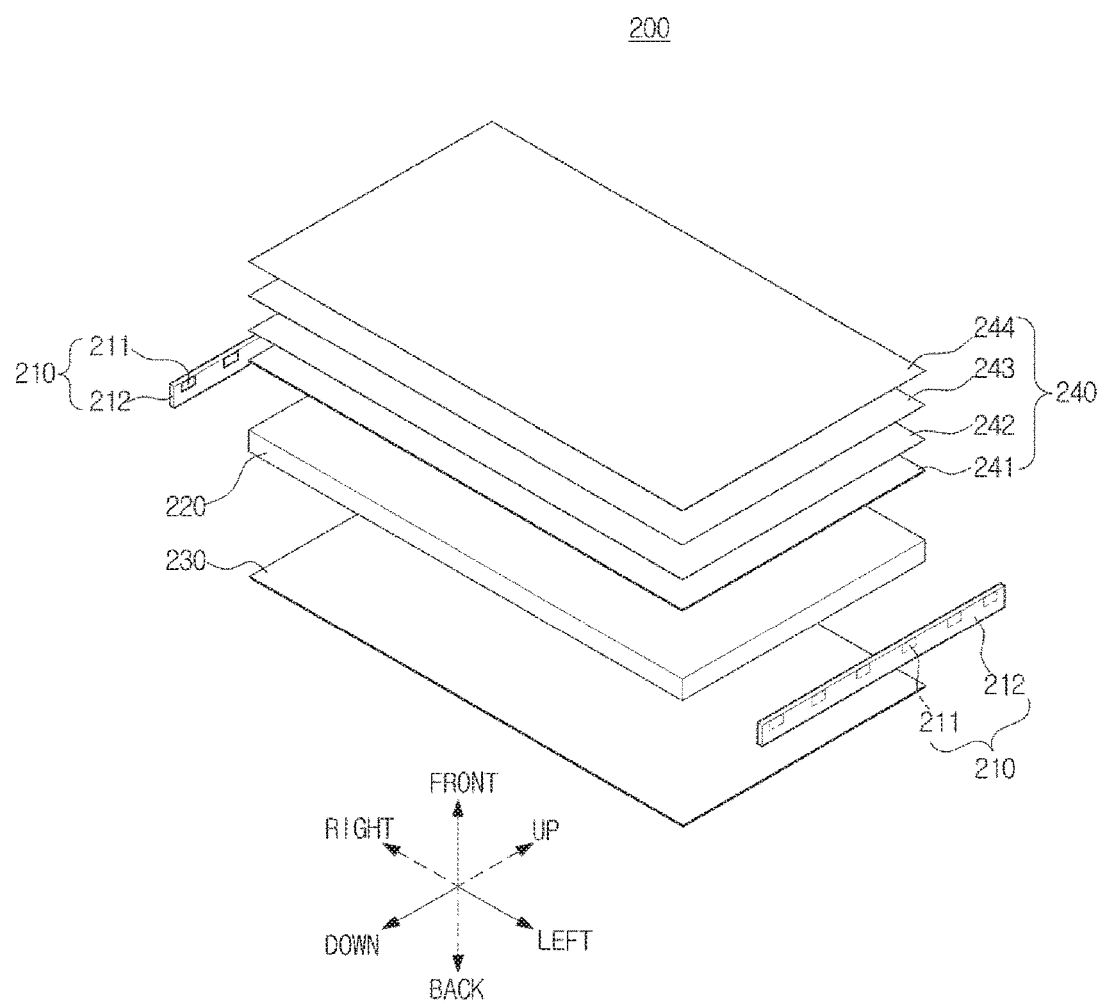
FIG. 4 is an exploded view of a backlight unit, according to an exemplary embodiment.
Figure 5:
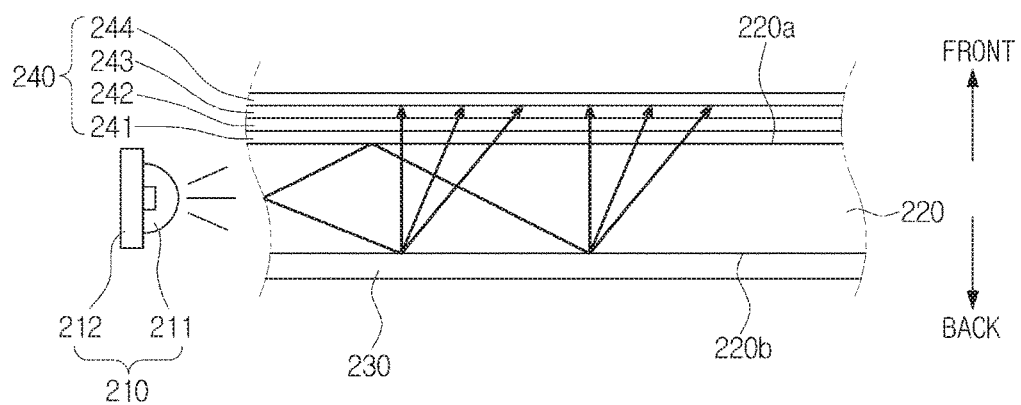
FIG. 5 is a side cross-sectional view of a backlight unit, according to an exemplary embodiment.
Figure 6:
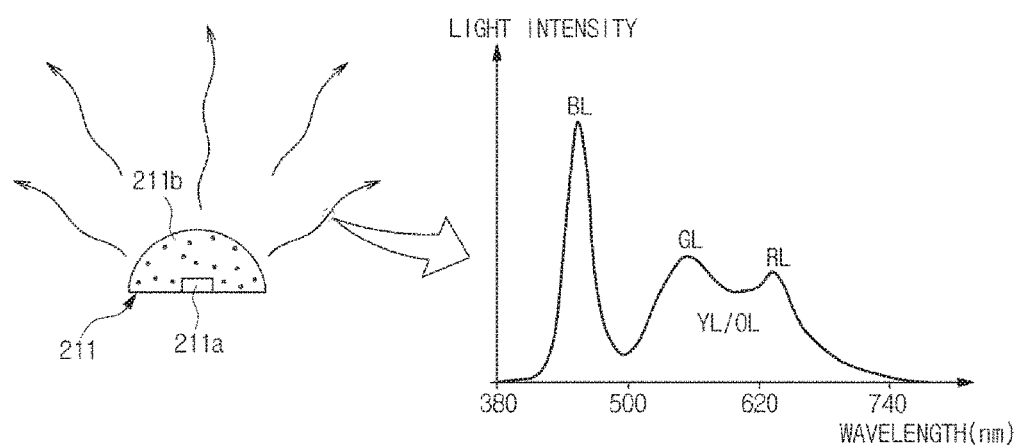
FIG. 6 shows a spectrum of light emitted from a light source included in a backlight unit, according to an exemplary embodiment.
Figure 7:
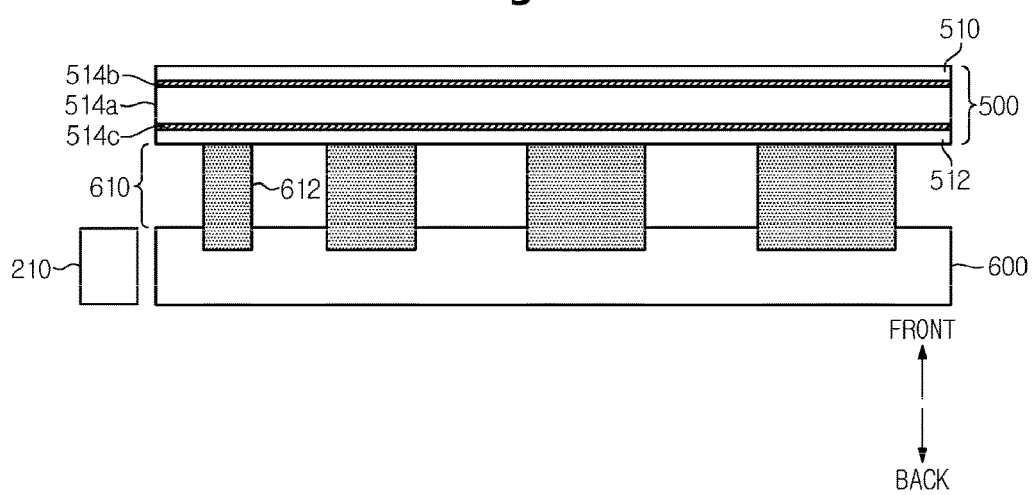
FIGS. 7 and 8 are side cross-sectional views of a light guide, according to an exemplary embodiment.
Figure 8:
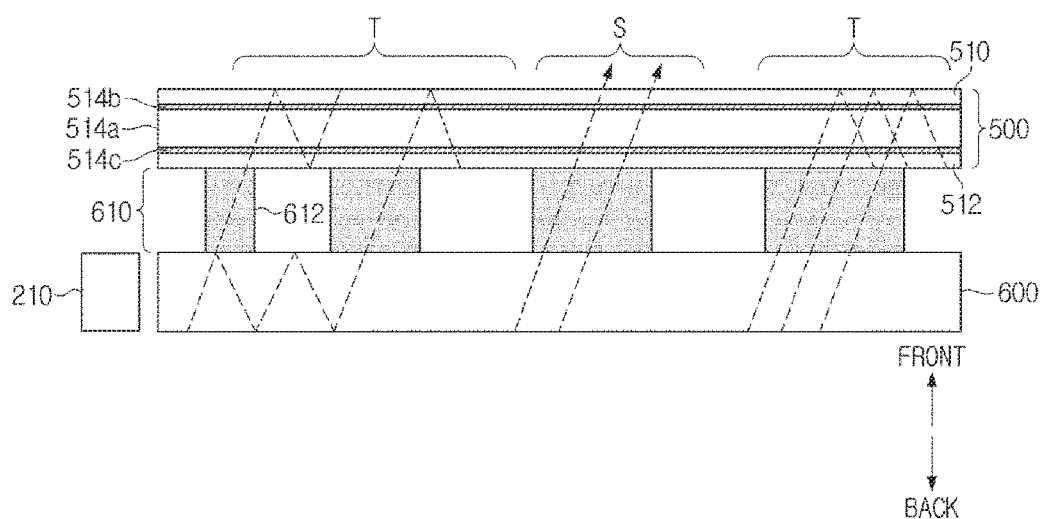
Figure 9:
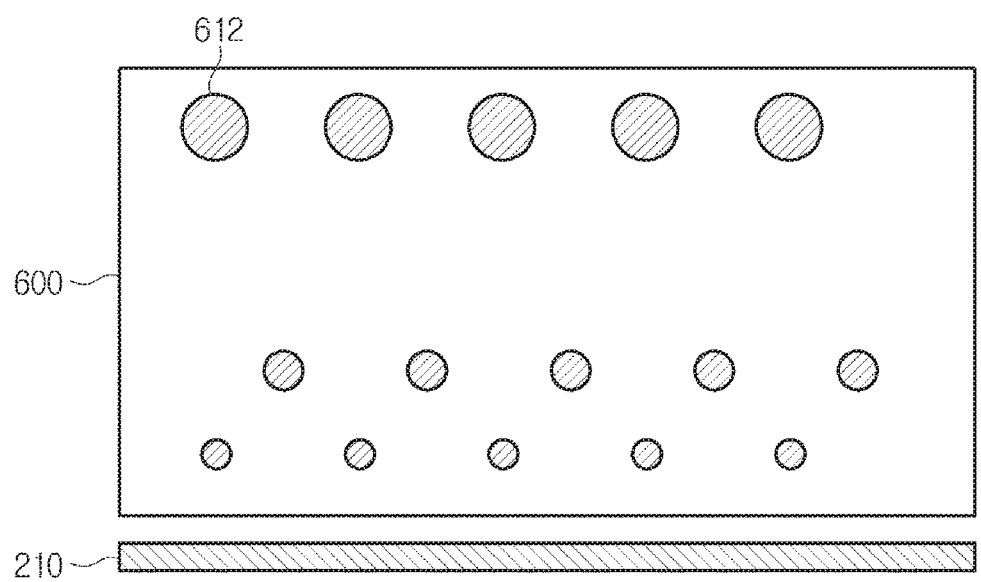
FIGS. 9 and 10 show adhesives on a light guide, according to exemplary embodiments.
Figure 10:
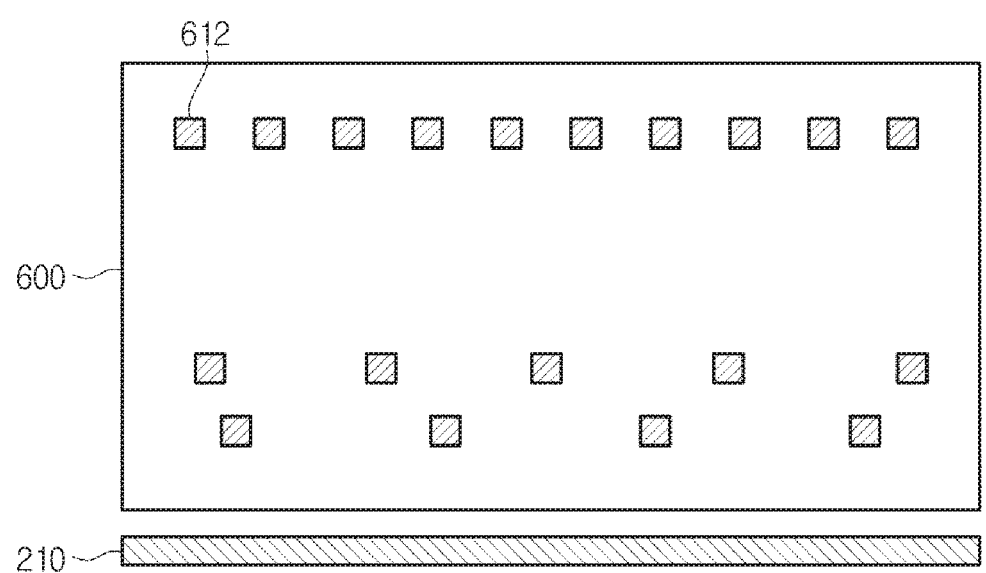

FIG. 4 is an exploded view of a backlight unit, according to an exemplary embodiment, and FIG. 5 is a side cross-sectional view of a backlight unit, according to an exemplary embodiment. FIG. 6 shows a spectrum of light emitted from a light source included in a backlight unit, according to an exemplary embodiment. FIGS. 7 and 8 are side cross-sectional views of a light guide, according to an exemplary embodiment, and FIGS. 9 and 10 show adhesives of a light guide, according to exemplary embodiments.

Referring to FIGS. 4, 5, and 6, the edge-type backlight unit 200 may include a light emitting module 210 for generating light, a light guide 220 for scattering light, a reflective sheet 230 for reflecting light, and an optical sheet 240 for improving light brightness.

The light emitting module 210 may include a plurality of light sources 211 for emitting light, and a supporting body 212 for supporting/fixing the plurality of light sources 211.

The plurality of light sources 211 may be uniformly located on either side of the backlight unit 200, as shown in FIG. 4, and may emit light toward the center of the backlight unit 200.

The plurality of light sources 211 may be arranged at regular intervals so that the light emitted from them has as uniform brightness as possible. For example, as shown in FIG. 4, the plurality of light sources 211 may be arranged at regular intervals on the left and right sides of the backlight unit 200. The arrangement of the light sources 211 is not, however, limited to what is shown in FIG. 4. For example, the light sources 211 may be arranged one of the left and right sides of the backlight unit 200.

The light sources 211 may employ devices capable of emitting monochromatic light (light having a particular wavelength, e.g., blue light) or white light (light with a mixture of various wavelengths) to various directions when powered. For example, the light sources 211 may employ low calorific light emitting diodes (LEDs) or Cold Cathode Fluorescent Lamps (CCFL).

Especially, the light source 211 may include a blue LED 211a for emitting high energy light, blue light, and a phosphor 211b for absorbing blue light and emitting green and red light, as shown on the left of FIG. 6.

The blue LED 211a of the light source 211 may be manufactured from an indium gallium nitride compound (InGaN) prepared by adding indium (In) to a gallium nitride compound (GaNO).

The phosphor 211b may convert energy absorbed from outside into visible rays, and emit the visible rays. The phosphor 211b may include a yellow phosphor (YAG), a KSF phosphor ($K_2SiF_6$), or a KTF phosphor ($K_2SiF_6$).

The light source 211 may emit blue light BL having a wavelength of about 450 nm, green light GL having a wavelength of about 535 nm, and red light RL having a wavelength of about 620 nm. However, the light source 211 emits not only the blue light BL, green light GL, and red light RL, but also, as illustrated on the right of FIG. 6, yellow light YL or orange light OL.

The supporting body 212 may fix the plurality of light sources 211 to prevent the light sources 211 from being moved. In addition, the supporting body 212 may supply power to each of the light sources 211 for light emission.

The supporting body 212 may be located on the side of the backlight unit 200 along with the light sources 211. For example, as illustrated in FIG. 4, the supporting body 212 may be arranged on each of the left and right sides of the backlight unit 200. However, the arrangement of the supporting body 212 is not limited to what is shown in FIG. 4. For example, the supporting body 212 may be located one of the left and right sides of the backlight unit 200. The supporting body 212 may be formed of a synthetic resin with conductive power supply lines formed therein or a printed circuit board (PCB) to fix the plurality of light sources 211 and supply power to the light sources 211.

The light guide 220 changes the traveling direction of light incident from the light emitting module 210 on the side and emits the light forward. The light guide 220 also scatters the light incident from the light emitting module 210 on the side to be emitted toward the front face of the light guide 220. The light guide 220 will now be described in detail.

The reflective sheet 230 is located behind the light guide 220 for reflecting light emitted through the back face of the light guide 220 toward the light guide 220.

The reflective sheet 230 may be manufactured by coating a highly reflective material on a base material. For example, the reflective sheet 230 may be manufactured by coating a polymer having a high reflectivity on a base material of polyethylene terephthalate (PET), or the like.

An optical sheet 240 may include various sheets to improve brightness and uniformity of the brightness. For example, the optical sheet 240 may include a diffuser film 241, a first prism film 242, a second prism film 243, and a reflective polarizer film 244.

The diffuser film 241 diffuses light to improve uniformity of brightness.

Light emitted from the light sources 211 may be diffused by the light guide 220 and further diffused by the diffuser film 241 included in the optical sheet 240.

Light passing through the diffuser film 241 is diffused in a direction parallel to the diffuser film 241, which may reduce the brightness.

The first and second prism films 242 and 243 may focus the light diffused by the diffuser film 241, thereby improving the brightness.

The first and second prism films 242 and 243 may have triangular prism patterns, which are arranged next to each other to form a plurality of bands. In this case, the directions of arrangement of prism patterns of the first and second prism films 242 may be orthogonal to each other.

Light penetrating the first and second prism films 242 and 243 has a viewing angle of about 70 degrees and travels to the front of the backlight 200, thereby improving brightness.

The reflective polarizer film 244 may transmit some of the incident rays while reflecting the others to improve brightness. For example, the reflective polarizer film 244 may transmit light in a predetermined polarization direction and reflect light in the other directions. A polarization direction of the reflective polarizer film 244 may be the same as that of the first polarizer film 111 as described above. As a result, the light penetrating the reflective polarizer film 244 may also penetrate the first polarizer film 111 included in the image forming unit 110.

The light reflected by the reflective polarizer film 244 may be reflected inside the backlight unit 200, and this reflection of light may improve brightness of the display device 100.

The optical sheet 240 is not limited to the sheets or films as illustrated in FIG. 5, and may further include various other sheets or films such as protective sheets.

In an exemplary embodiment, the light guide 220 may include a light guide plate 600, a light regulator 500 arranged in front of the light guide plate 600 for regulating emission of light incident through the light guide plate 600, and a plurality of adhesives 612 for bonding the light guide plate 600 and the light regulator 500.

To change the light traveling direction, a plurality of swollen stripes may be formed on the front face of the light guide plate 600, and a plurality of dots may be formed on the rear face of the light guide plate 600. The sizes and intervals of the swollen stripes and dots may be adjusted to emit uniform light in the forward direction of the light guide plate 600. Furthermore, the swollen stripes on the front face of the light guide plate 600 may be embossed through a printing method, and the dots on the rear face of the light guide plate 600 may be formed in intaglio with laser beams. Furthermore, to make the adhesive 612 thinner than a predetermined thickness, a certain surface process may be performed on the front face of the light guide plate 600.

As described above, since the light emitting module 210 is arranged on the side of the backlight unit 200, the position of the light emitting module 210 may cause non-uniform brightness. Accordingly, to eliminate the non-uniformity of brightness due to the position of the light emitting module 210, diffusion of the light emitted from the light emitting module 210 inside the light guide plate 600 may be required. For example, to diffuse the light, the light guide plate 600 may have a milk color.

The light incident onto the light guide plate 600 may travel in various directions inside the light guide plate 600 depending on the incidence angle. For example, as shown in FIG. 5, the light incident onto the front face of the light guide plate 600 may be reflected on the front face of the light guide plate 600 and may travel toward the rear face, or refracted at the front face of the light guide plate 600 to be incident upon the optical sheet 240. The light incident onto the rear face of the light guide plate 600 may be reflected on the rear face of the light guide plate 600, or scattered by the dots on the rear face of the light guide plate 600 to travel toward the front face.

Due to the reflection of light that occurs on the front and rear faces of the light guide plate 600, the light incident onto the side of the light guide plate 600 may travel to the center of the light guide plate 600. Due to the scattering of light that occurs on the rear face of the light guide plate 600 and the refraction of light that occurs on the front face of the light guide plate 600, the light inside the light guide plate 600 may emit through the front face of the light guide plate 600.

The light guide plate 600 may employ poly-methyl methacrylate (PMMA) or transparent polycarbonate (PC).

The light regulator 500 may be stuck to the front face of the light guide plate 600 by the adhesives 612. The light regulator 500 may include a light regulating layer 514a for regulating emission of incident light, and front and back transparent substrates arranged on the front and back of the light regulating layer 514a, respectively, for supporting the light regulating layer 514a.

The light regulating layer 514a may include a material for regulating emission of light incident onto the light regulator 500, and front and back electrodes 514b and 514c arranged to apply voltage to the material.

The front and back electrodes 514b and 514c of the light regulating layer 514a are formed of a transparent substance to transmit light incident from outside. The front and back electrodes 514b and 514c of the light regulating layer 514a may also be formed of ITO, IZO, silver (Ag) nano wire, CNT, graphene, or 3,4-ethylenedioxythiophene (PEDOT).

The front electrode 514b may be arranged on the rear face of the front substrate 510, and the back electrode 514c may be arranged on the front face of the back substrate 512. The front and back electrodes 514b and 514c may be arranged to cross each other.

The light regulator 500 may provide a scattering mode S to scatter light to be emitted through the front face of the light regulator 500, and a transparent mode T to have the light travel inside the light regulator 500 not to be emitted through the front face of the light regulator 500, depending on the voltage applied by the front and back electrodes 514b and 514c, as shown in FIG. 8.

For example, the light regulator 500 may provide the transparent mode T to not emit light from where no voltage is applied by the front and back electrodes 514b and 514c, and provide the scattering mode S to emit light through the front face of the light regulator 500 by scattering the light at where a voltage is applied by the front and back electrodes 514b and 514c.

The light regulating layer 514a may include an optically anisotropic material to regulate light scattering, e.g., liquid crystal, which is able to scatter light or have light travel inside the light regulating layer 514a depending on voltage application. The liquid crystal is merely an example, and the material for the light regulating layer 514a is not limited to the liquid crystal.

If the light travels inside the light regulator 500, light absorption may occur in the front and back electrodes 514b and 514c. Accordingly, if light is incident from the light source 211 directly onto the side of the light regulator 500, the intensity of light traveling inside the light regulator 500 decreases the farther the light is from the light source 211. The decrease in intensity of light with increasing distance from the light source 211 may prevent the light from being uniformly emitted through the front face of the light regulator 500 regardless of the distance from the light source 211. To solve the problem, in an exemplary embodiment, the adhesive 612 is used to stick the light guide plate 600 to the back face of the light regulator 500.

As shown in FIGS. 6 and 7, the plurality of adhesives 612 are placed between the light regulator 500 and the light guide plate 600 to bond them together. The plurality of adhesives 612 may be implemented with optical clear adhesives.

The plurality of adhesives 612 may have a refractive index matching refractive indexes of the light guide plate 600 and light regulator 500, so that the light incident onto the light guide plate 600 may be emitted to the light regulator 500. In other words, as shown in FIG. 7, the light traveling inside the light guide 600 may be incident onto the light regulator 500 through the adhesive 612.

The light traveling inside the light regulator 500 decreases in intensity the farther the light is from the light source 211, so the exemplary embodiment may adjust the area (or cross-section area) or number of the adhesives 612 to increase the intensity of the light incident onto the light regulator 500 the farther the light is from the light source 211.

For example, as shown in FIG. 9, the plurality of adhesives 612 are formed to have an increasing area the farther it is from the light source 211. Since the intensity of light passing through the adhesive 612 increases as the area of the adhesive 612 increases, the intensity of light incident onto the light regulator 500 through the adhesive 612 may increase the farther the light is from the light source 211.

In other words, since the intensity of light emitted from the light guide plate 600 and incident onto the light regulator 500 through the adhesive 612 increases while the intensity of light traveling inside the light regulator 500 decreases the farther the light is from the light source 211, the decrease in intensity of light may be compensated.

Although the shape of the cross-section of the adhesives 612 is shown to be circular, it is not limited thereto, and the adhesives 612 may have any other shape. In another exemplary embodiment, the adhesives 612 may have different shapes. As the area of the adhesive 612 increases, the gap between the adhesives 612 may be narrowed. The area of the adhesive 612 may be determined for as high intensity of light as to compensate the decrease in intensity of light traveling inside the light regulator 500 to pass through.

In another example, as shown in FIG. 10, the number of the adhesives 612 increases the farther the adhesives 612 are from the light source 211. Since the total intensity of light passing through the adhesives 612 increases as the number of the adhesives 612 increases, the intensity of light incident onto the light regulator 500 through the adhesives 612 may increase the farther the light is from the light source 211.

It may be defined that the number of the adhesives 612 present in a predetermined unit area increases the farther the adhesives 612 are from the light source 211. The plurality of adhesives 612 may be implemented to increase in number while the shapes or areas of the adhesives 612 remain the same, as they are farther from the light source 211. Alternatively, the plurality of adhesives 612 may have different shapes but identical areas, or have different shapes and different areas within a predetermined error.

In the meantime, if the adhesive 612 is thicker than a particular length, the light penetrating the adhesive 612 may be scattered on the side of the adhesive 612. In an exemplary embodiment, to prevent the scattering of light on the side of the adhesive 612, the adhesive 612 may be formed to be thinner than a predetermined thickness. The thickness of the adhesive 612 means a length in a direction in which the adhesive 612 extends from front to back. The predetermined thickness of the adhesive 612 may be calculated and determined as minimizing the scattering of light on the side.

In an exemplary embodiment, the adhesive 612 may be formed to have the predetermined thickness and may bond the light guide plate 600 and the light regulator 500. Alternatively, the adhesive 612 may be arranged on the surface of the light guide plate 600 with a certain surface process performed thereon to have a thickness less than a predetermined thickness. For example, a predetermined-depth groove may be formed on the surface of the light guide plate 600 for receiving the adhesive 612, and the adhesive 612 may be formed in the groove, so the thickness of the adhesive 612 from the surface of the light guide plate 600 may be less than the predetermined thickness. The surface process to be performed on the front face of the light guide plate 600, which allows the adhesive 612 to be thinner than the predetermined thickness, is not limited to the aforementioned example.

Exemplary embodiments enable uniform emission of light and reduce a loss of brightness.

Several exemplary embodiments have been described, but a person of ordinary skill in the art will understand and appreciate that various modifications can be made without departing the scope of the present disclosure. Thus, it will be apparent to those ordinary skilled in the art that the disclosure is not limited to the exemplary embodiments described, which have been provided only for illustrative purposes.

What is claimed is:

1. A display device comprising:
   a backlight; and
   a display panel configured to create an image by selectively blocking light emitted from the backlight,
   wherein the backlight comprises:
   a light regulator configured to regulate emission of incident light;
   a light guide plate arranged behind the light regulator; and
   a plurality of adhesives that are optically transparent and arranged to bond the light regulator and the light guide plate, wherein respective cross-section areas of the plurality of adhesives increase as distance from a light source increases, wherein the plurality of adhesives have a refraction index corresponding to both a refraction index of the light guide plate and a refraction index of the light regulator, and wherein each of the plurality of adhesives is thinner than a predetermined thickness.

2. The display device of claim 1, wherein a first number of the plurality of adhesives located a first distance from the light source is less than a second number of the plurality of adhesives located a second distance greater than the first distance from the light source.

3. The display device of claim 1, wherein a first gap between a first adhesive and a second adhesive of the plurality of adhesives located a first distance from the light source is greater than a second gap between a third adhesive and a fourth adhesive of the plurality of adhesives located a second distance greater than the first distance from the light source.

4. The display device of claim 1, wherein the refraction index of the plurality of adhesives corresponds to a refraction index of the light regulator.

5. The display device of claim 1, wherein the light guide plate defines a plurality of grooves in which the plurality of adhesives are located, and wherein each of the plurality of adhesives is thinner than a predetermined thickness.

6. The display device of claim 1, wherein the light regulator comprises:

a light regulating layer comprising a material to regulate emission of incident light; and a plurality of electrodes respectively arranged on front and back sides of the light regulating layer, and wherein each of the plurality of electrodes is configured to apply voltage to the light regulating layer.

7. A backlight comprising:

a light source;

a light guide plate configured to scatter light emitted from the light source;

a light regulator disposed on the light guide plate and configured to regulate emission of incident light; and a plurality of adhesives that are optically transparent and arranged to bond the light regulator and the light guide plate, wherein a first number of the plurality of adhesives located a first distance from the light source is less than a second number of the plurality of adhesives located a second distance greater than the first distance from the light source, wherein the plurality of adhesives have a refraction index corresponding to both a refraction index of the light guide plate and a refraction index of the light regulator, and wherein each of the plurality of adhesives is thinner than a predetermined thickness.

8. The backlight of claim 7, wherein respective cross-section areas of the plurality of adhesives increase as distance from the light source increases.

9. The backlight of claim 7, wherein a first gap between a first adhesive and a second adhesive of the plurality of adhesives located the first distance from the light source is greater than a second gap between a third adhesive and a fourth adhesive of the plurality of adhesives located the second distance from the light source.

10. The backlight of claim 7, wherein the refraction index of the plurality of adhesives corresponds to a refraction index of the light regulator.

11. The backlight of claim 7, wherein the light guide plate defines a plurality of grooves in which the plurality of adhesives are located on the top, and wherein each of the plurality of adhesives is thinner than a predetermined thickness.

12. A display device comprising:

a backlight; and a display panel configured to create an image by selectively blocking light emitted from the backlight, wherein the backlight comprises:

a light regulator configured to regulate emission of incident light;

a light guide plate disposed on a first side of the light regulator; and a plurality of adhesives that are optically transparent and arranged to bond the light regulator and the light guide plate, wherein at least one among respective of cross-section areas and quantity of the plurality of adhesives increase as distance from a light source increases, wherein the plurality of adhesives have a refraction index corresponding to both a refraction index of the light guide plate and a refraction index of the light regulator, and wherein each of the plurality of adhesives is thinner than a predetermined thickness.

13. The display device of claim 12, wherein a first gap between a first adhesive and a second adhesive of the plurality of adhesives located a first distance from the light source is greater than a second gap between a third adhesive and a fourth adhesive of the plurality of adhesives located a second distance from the light source.

14. The display device of claim 1, wherein the plurality of adhesives are disposed on a first side of the light guide plate, and wherein a plurality of etched dots are formed on a second side of the light guide plate.

* * * * *